United States Patent [19]
Bostock et al.

[11] Patent Number: 5,961,849
[45] Date of Patent: Oct. 5, 1999

[54] MINIATURE MOUNTING DEVICE AND METHOD

[75] Inventors: Roger Mark Bostock, Cambridge, United Kingdom; Peter Gravesen, Nordborg, Denmark; Robert Jones; David Frank Moore, both of Cambridge, United Kingdom; Kasper Mayntz Paasch, Sonderborg, Denmark

[73] Assignee: Cambridge Consultants Ltd., Cambridge, United Kingdom

[21] Appl. No.: 08/875,564

[22] PCT Filed: Jan. 26, 1996

[86] PCT No.: PCT/GB96/00176

§ 371 Date: Apr. 6, 1998

§ 102(e) Date: Apr. 6, 1998

[87] PCT Pub. No.: WO96/23238

PCT Pub. Date: Aug. 1, 1996

[30] Foreign Application Priority Data

Jan. 25, 1995 [GB] United Kingdom .................... 9501647

[51] Int. Cl.[6] .............................. B44C 1/22; H01L 21/00
[52] U.S. Cl. .................................. 216/24; 216/2; 216/52; 385/83
[58] Field of Search .................................. 216/2, 24, 33, 216/41, 52, 79, 99; 438/733, 739, 753; 385/83, 132

[56] References Cited

U.S. PATENT DOCUMENTS

| 3,765,969 | 10/1973 | Kragness et al. |
| 3,887,404 | 6/1975 | Chane .................................. 438/733 X |
| 4,810,557 | 3/1989 | Blonder . |
| 4,973,133 | 11/1990 | Matz et al. ............................ 216/24 X |
| 5,006,201 | 4/1991 | Kaukeinen ............................... 216/24 |
| 5,045,151 | 9/1991 | Edell ....................................... 438/739 |

FOREIGN PATENT DOCUMENTS

| C 42 13 118 | 6/1993 | Germany . |
| A 42 36 742 | 5/1994 | Germany . |
| A 2 000 877 | 1/1979 | United Kingdom . |

OTHER PUBLICATIONS

Patent Abstract of Japan, vol. 008, No. 092(P–271), Apr. 27, 1984 JP, 59 007 913 (Fujitsu KK), Jan. 17, 1984–Okiyama Tadashi ET AL, (Inventor.

Electronics Letters, vol. 24, No. 15, Jul. 21, 1998, pp. 918/919 XP000045141, B. Hillerich t al: "Self–Aligned Flat–Pack Fibre–Diode Coupling"–entire document.

Patent Abstracts of Japan, vol. 006, No. 148 (P–133), Aug. 7, 1982 & JP A 57 068809 (NEC Corp.), Apr. 17, 1982–Abstract.

Patent Abstracts of Japan, vol. 006, No. 185 (E–132), Sep. 21, 1982 & JP A 57 100731 (NEC Corp.), Jun. 23, 1982–Abstract.

Patent Abstracts of Japan, vol. 007, No. 018 (P–170), Jan. 25, 1983 & JP A 57 172309 (Tateishi Denki KK), Oct. 23, 1982–Abstract.

Patent Abstracts of Japan, vol. 008, No. 092 (P–271), Apr. 27, 1984 & JP A 59 007913 (Fujitsu KK), Jan. 17, 1994–Abstract.

Patent Abstracts of Japan, vol. 013, No. 075 (P–831), Feb. 21, 1989 & JP A 63 261206 (Nippon Telegr. & Teleph. Corp.; Others: 01), Oct. 27, 1988–Abstract.

*Primary Examiner*—William Powell
*Attorney, Agent, or Firm*—Frishauf, Holtz, Goodman, Langer & Chick, P.C.

[57] ABSTRACT

A miniature mounting device on which elements such as optical filters can be accurately held. The device includes a substrate having a machined groove with an enlarged opening for receiving the element, and an overlayer extends at least partially over the groove to clamp the element.

29 Claims, 9 Drawing Sheets

METAL LAYER UNDER TENSILE STRESS ature mounting device fabricated from silicon and for
MINIATURE MOUNTING DEVICE AND METHOD The present invention concerns micromachined devices and in particular devices which can support one or more miniature elements in such a matter that the or each element can be positioned and held both with a very high degree of accuracy and without the risk of the element being damaged by its manipulation relative to the device in which it is held.

The invention finds particular application in the optical fibre field. However, whilst the following specification is basically directed to this field, it will be appreciated that the inventive concept is also applicable in other fields where the accurate positioning of very small elements or components is called for. An example of such an alternative field is that of biomedicine.

There has been over recent years a substantial increase in the use of fibre optics both for data communication and data manipulation. The advantages afforded by fibre optics are well-known, but in parallel with this expansion there has arisen a particular problem concerning the coupling of optical fibres either to one another or to other components such as wave guides or optoelectronic devices. For example, in order to achieve good coupling efficiency between two monomode optical fibres, or between a monomode fibre and another element, the actual coupling has to be performed with sub-micron accuracy and in a reliable and stable manner. These requirements have meant that the price of providing optical connections between optical fibres and between fibres and other components is extremely high relative to the actual cost of the elements and has accordingly provided a definite brake on the expansion of electro-optical devices.

There have been several attempts to provide accurate and relatively low cost devices for clamping optical fibres during their connections to other fibres or elements.

For example, an article entitled "Laser machining of silicon for fabrication of new microstructures" by M. Alavi, S. Buttgenbach, A Schumacher and H. J. Wagner discloses the use of laser beams for micromachining silicon substrates using the local destruction of limiting planes by laser melting followed by anisotropic etching of the disordered zones. By use of this technique microslits can be formed in the silicon substrate which can be used to locate optical elements such as optical fibres or miniature lenses.

An article in the Journal of Micromechanics and Microengineering published on 25 Jun. 1991 and entitled "LIGA-based flexible microstructures for fiber-chip coupling" represents another approach to the already described problem of optical fibre coupling. This article describes the use of deep-etch lithography in combination with a high-precision replication process to produce an element in which fibres are guided by stop faces and are pressed into engagement with the stop faces by spring elements which are fabricated as part of the element. This arrangement is said to result in precise horizontal location of the fibres. However, it is still a relatively expensive process and vertical control of the horizontally located fibres is achieved by the subsequent use of a cover plate.

In accordance with a first aspect of the present invention there is provided a miniature device for mounting one or more elements and comprising a substrate having a groove formed therein, the groove having at least one enlarged opening portion leading into the groove for coarse positioning of an element when it is initially inserted into the groove, and an overlayer extending at least partially over said groove and adapted to clamp an element when the latter has been inserted into the groove.

In accordance with a second aspect of the invention there is provided a miniature component incorporating a device as set out hereinbefore.

In accordance with a third aspect of the present invention there is provided a method of manufacturing a miniature mounting device comprising micromachining a groove in a substrate and providing an overlayer on the substrate adapted to clamp an element when the latter has been inserted into the groove.

In order that the present invention may be more readily understood, various embodiments thereof will now be described by way of example with reference to the accompanying drawings, in which.

Figure 1:
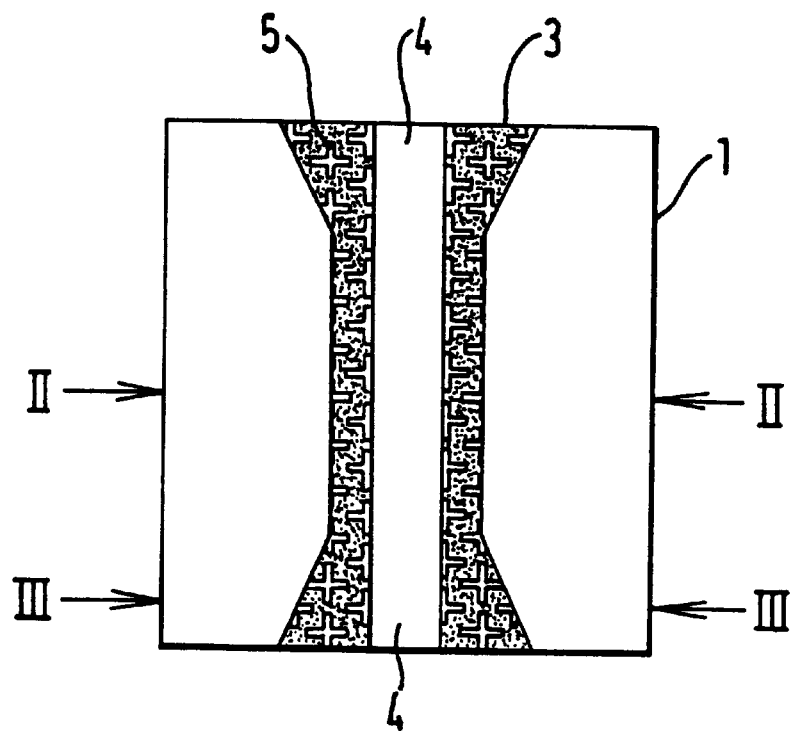
FIG. 1 is a plan view of a first embodiment of a microminiature clamping device in accordance with the present invention.

Referring now to the drawings, FIG. 1 shows a microminiature mounting device fabricated from silicon and for mounting a pair of elements in the form of optical fibres. In this figure the fibres have not been shown. The diameter of optical fibres is in the region of 150 microns.

Figure 2:
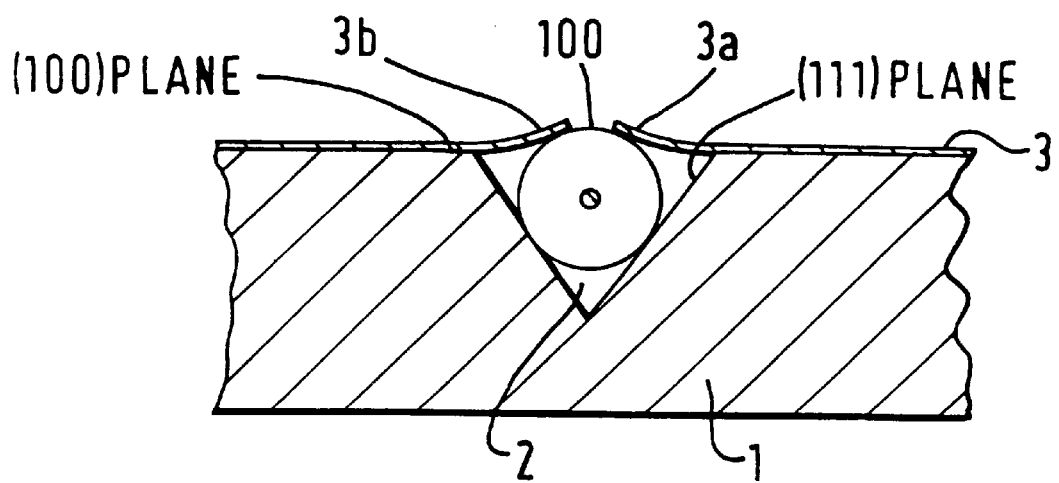
FIG. 2 is a cross-section on line II—II of the device of FIG. 1.

The device comprises a crystalline silicon substrate 1 which has micromachined therein a groove 2 the central portion of which is v-shaped (as can best be seen from FIG. 2). The central portion of groove 2 tapers outwardly at its ends to provide enlarged opening portions 2A and 2B which can best be seen in FIG. 3. These tapered opening portions 2A, 2B are both deeper and wider than the central v-shaped groove 2. As the present description is being given with regard to the mounting of optical fibres the depth of groove 2 will be in the region of 150 microns.

The uppermost surface of the device is covered with an overlayer 3 having slit 4 the longitudinal axis of which lies directly above the base of groove 2. In the present embodiment this overlayer is of low stress silicon nitride and it provides a pair of resilient lips 3A, 3B which overlap the groove 2 and opening portions 2A, 2B. The thickness of the overlayer 2 in the present embodiment can be between 1 to 10 microns.

Figure 3:
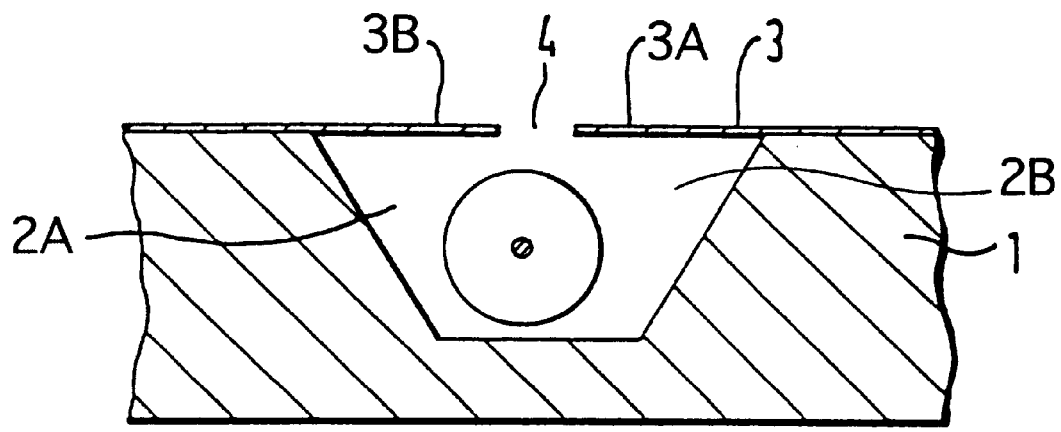
FIG. 3 is a cross-section on line III—III of FIG. 1.

When the device of FIGS. 1 to 3 is used to couple a pair of optical fibres one of the fibres is inserted via one of the respective opening portions 2A or 2B into the central v-shaped section of the groove. The enlarged portion allows initial coarse positioning of the fibre until the fibre end reaches the central v-groove portion, after which the fibre is accurately positioned in a kinematic fashion by the micromachined structure of the v-groove and the overlapping lips. FIG. 3 shows an initially coarsely positioned fibre at its point of insertion into the device.

As can be seen from FIG. 2, the passage of the end of a fibre 100 along the central v-shaped groove causes an upward displacement of the lips 3A, 3B of the overlayer 3 so that the displaced lips provide a degree of clamping. Once one fibre has been inserted into one side of groove 2 the other fibre is inserted in a similar manner and pushed into the groove until the ends of the two fibres butt. The clamped ends of the two fibres may then be set in place using UV-curing glue or another suitable adhesive.

It will be seen that during this procedure the location of the fibres is entirely passive in that apart from the act of inserting and feeding the fibres no other active adjustment is required.

In the present embodiment the process of manufacturing the device involves depositing the silicon nitride overlayer 3 onto a silicon wafer. One method of achieving this is the well-known process of radio frequency plasma deposition. A photolithographic mask is then printed onto the deposited layer 3. The pattern of the mask is indicated in FIG. 1 at 5. This pattern 5 serves two purposes during the manufacture of the device. In the first instance it defines the slit 4 in the overlayer 3 which will in the final manufactured device provide the lips 3A, 3B which act to clamp inserted fibres. In the second instance it defines the v-groove in the silicon, including the end tapers which provide the enlarged opening portions 2A, 2B. This is achieved by the pattern of the spaces in the silicon nitride that allows the silicon etchant to under-etch the lips.

The silicon substrate is formed of silicon having specific crystal orientations which allow the etching to be carried out in such a manner as to ensure the required shape for the groove 2 and its entrant portions. Etching can be carried out using potassium hydroxide as a wet etchant.

The etching is carried out in an anisotropic manner as is, for example, described in U.S. Pat. No. 5,087,124. The etching is carried out in the <100> direction of the crystalline silicon with <111> side walls.

Due to the anisotropy of the silicon etch the final edges of the v-groove are well defined by the edges of the pattern in the mask. This gives a channel whose depth is defined by the mask and is independent of the etchant concentration or the time for which the device is etched. The etch is stopped by the (111) crystal plane which is consistent along the length of the groove 2. The alignment of two fibres inserted into the groove is therefore accurate to the consistency of this crystal plane. It is because of this accuracy that the locations of the end faces of the two fibres can be carried out in a manner to ensure successful coupling.

In the embodiment of FIG. 1 the lithographic pattern allows the formation of continuous lips which overhang the groove 2. As already stated, this continuous lip means that as a fibre is inserted into the groove the fibre end lifts the lip immediately ahead of the fibre end. In combination with the taper this prevents a fibre end face from snagging the lips with consequent damage to them.

Figure 4:
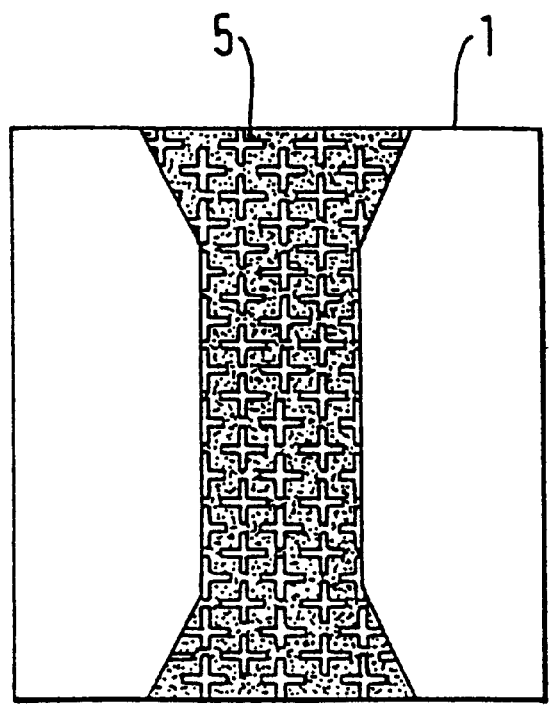
FIG. 4 is a plan view of a second embodiment of a microminiature device.

It will be appreciated that the exact form of the space filling pattern deposited in the lithographic process can be adjusted to alter the form of the enlarged opening portions 2A, 2B or to alter the mechanical properties of the lips 3A, 3B. In f act, as shown in FIG. 4 of the accompanying drawings, it is possible to etch the groove 2 in such a manner that the overlayer 3 extends continuously across the groove.

Figure 5:
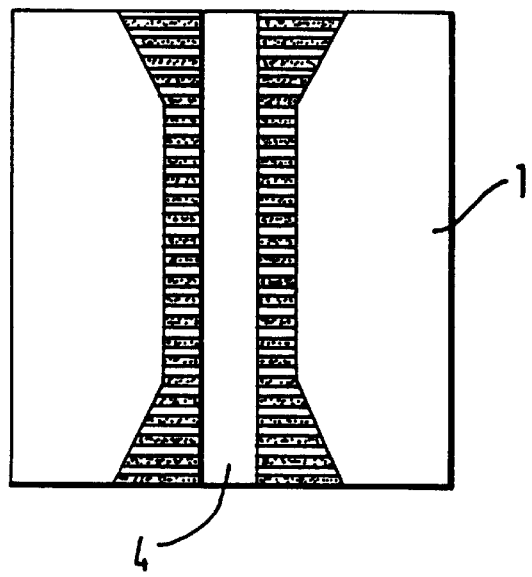
FIG. 5 shows a third embodiment of the invention.

An alternative way in which the lip portions can be provided is shown in FIG. 5 of the drawings. In this embodiment it will be seen that the lip portions are etched as a series of parallel beams which extend cantilever-fashion over the groove. These beams act in exactly the same manner as the continuous lips 3A, 3B shown in FIG. 1.

In all of these embodiments, and in the embodiments to be described subsequently, the anisotropy of the silicon edge leaves ridges in the enlarged tapered portions 2A, 2B of the groove 2, as the sides of these portions do not lie parallel to the sides of the crystal plane. These ridges ascend the side walls of the tapered portions at an angle, forming a taper in their own right and guiding the fibre into the groove. These ridges can be further smoothed by a brief isotropic etch to remove the sharpness of the ridge edges.

The previous embodiments have been concerned with the coupling together of two optical fibres. However an equally important aspect of the invention is the coupling of an optical fibre to an element such as an optoelectronic device or a waveguide.

Figure 6:
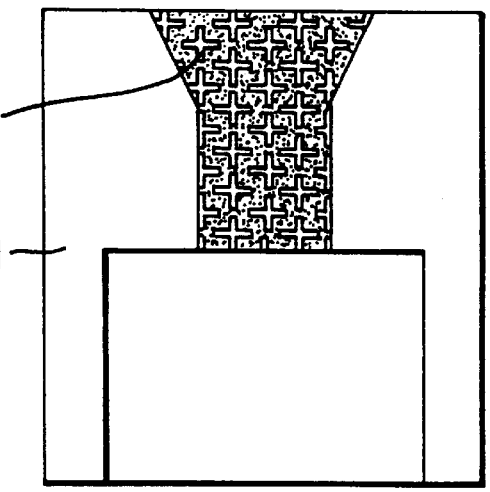
FIG. 6 is a plan view of a fourth embodiment.

FIG. 6 of the accompanying drawings shows in simplified form such an embodiment. It will be seen that in this embodiment the silicon chip has been machined so that one end of the groove 2 shown in FIG. 1 has been replaced by a location space 6 for an optoelectrical device. Also in this embodiment the overlayer 3 is continuous.

Figure 7:
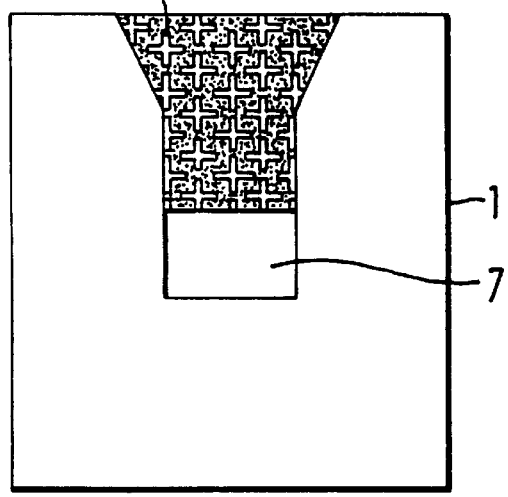
FIG. 7 is a plan view of a fifth embodiment.

FIG. 7 of the accompanying drawings shows a further embodiment in which a single optical fibre (not shown) is mounted in the device so that the end face of the fibre in the device is accurately positioned with respect to a machined inclined surface 7 in the silicon substrate which acts as a mirror. Silicon has considerable reflective properties and these can be increased by the deposition of an additional metallic layer. Again, in the FIG. 7 embodiment a continuous overlayer 3 is provided above groove 2.

Figure 8A:
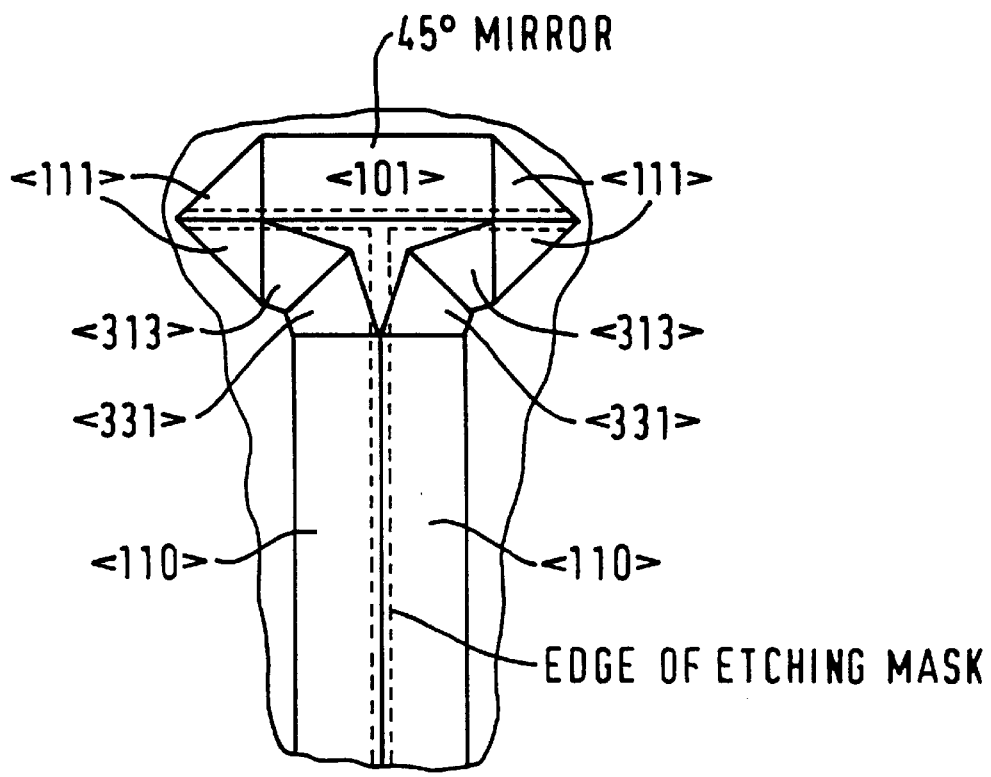
FIGS. 8A, 8B and 8C show the embodiment of FIG. 7 in greater detail.
Figure 8B:
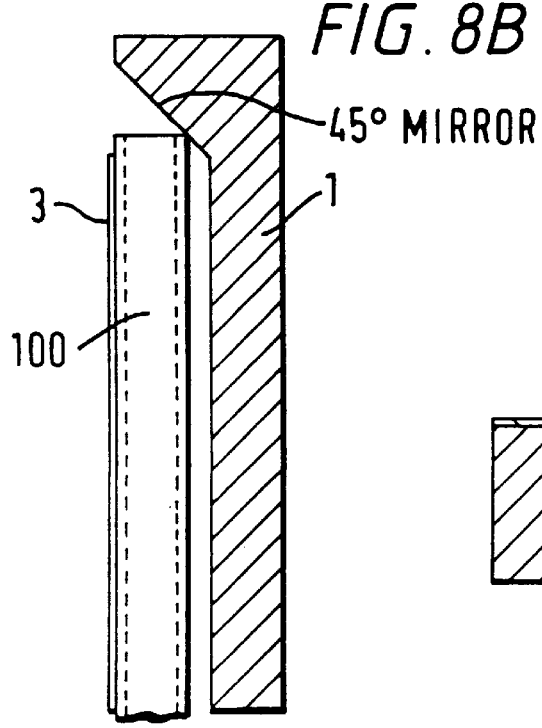
Figure 8C:
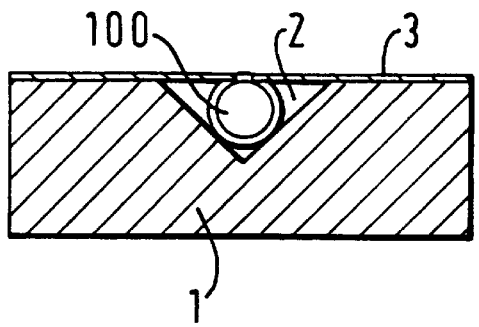

If the etching of the silicon substrate in the embodiment of FIG. 7 has been carried out along the <110> direction with <111> side walls the mirror portion 7 will be at 54.7° rather than the preferred 45°. For monomode optical fibres the anisotropic etching is carried out with <111> side walls as the accuracy of the alignment of monomode fibres is extremely critical and requires sub-micron tolerance. Accordingly the 54.7° walls provided by the <111> side walls is necessary for the required degree of accuracy. However, with multimode optical fibres the precision of the width and depth of the groove is less critical as tolerances can be ± 5µm. Accordingly, in this embodiment it is also possible to align the v-groove 2 in the <100> direction of the crystalline substrate resulting in relatively slow etching <110> side walls when using an EDP etch mixture or Potassium Hydroxide with added Iso-Propyl alcohol. In such a case the mirror 7 will be defined by a <110> plane and consequently will be a perfect 45° mirror. This is the arrangement shown in FIGS. 8A, 8B and 8C. FIG. 8B in particular shows the crystal planes involved in the manufacture of the 45° mirror 7.

Figure 9:
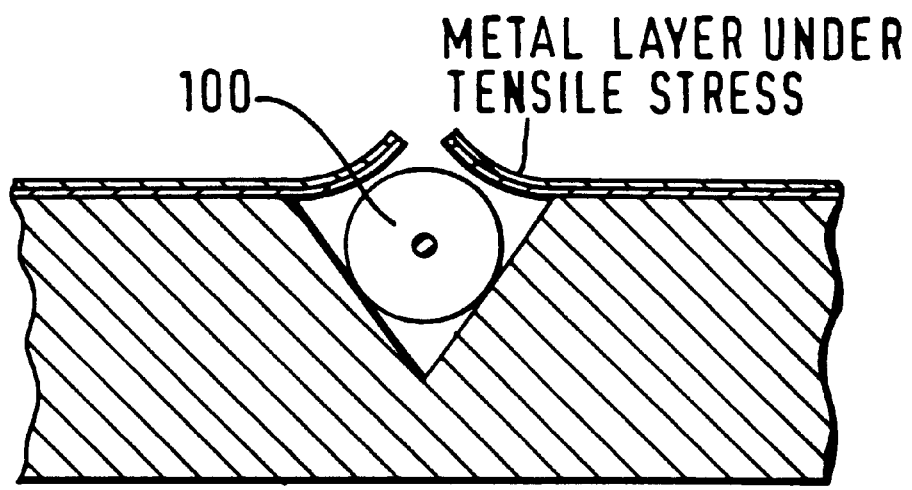
FIG. 9 shows a still further embodiment.

All the previous embodiments have been concerned with the provision of an overlayer which actually contacts an optical fibre as it is fed into the clamping device. For certain applications it may be preferable for the overlayer not to contact the fibre during its insertion and only subsequent to the insertion of the fibre be caused to clamp it in position. This result can be achieved by the embodiment shown in FIG. 9 of the drawings. The FIG. 9 embodiment is essentially identical to that of FIG. 1 save that the two lips 3A, 3B are pre-stressed so that they curve upwardly from the plane of the overlayer 3 prior to the insertion of the optical fibre and are not bent into this configuration by the insertion of the optical fibre. Once the or each optical fibre has been inserted into the groove, as is shown in this figure, the overlayer 3 is then treated so as to remove the tensile stress and to allow the lips 3A, 3B to move under their own resilience to the positions as shown in FIG. 2 thereby to securely clamp the fibre or fibres within the device.

FIG. 10 of the accompanying drawings shows one way in which this result can be achieved. Thus FIG. 10A shows the first step in the process. In this figure the silicon substrate 1 and the silicon nitride overlayer 3 are identical to the corresponding elements of the previous embodiments. In addition, there is provided by a suitable deposition process a thin layer 10 of chromium and over the chromium layer a final layer of photoresist. As in the previous embodiments a photolithographic pattern is formed in the photoresist. This is shown in FIG. 10B. The next step, shown in FIG. 10C, is to etch the chromium layer. The next step is shown in 10D and comprises etching in known manner the silicon nitride overlayer. The final step in the preparation of the device for subsequent use is, as in the preceding embodiments, wet etching of the silicon substrate, the groove 2 and one or more enlarged entrance portions. As can be seen in FIG. 10E, after this wet etching of the silicon has been carried out the tensile stress in the chromium layer causes the lips 3A, 3B to bend upwardly away from the v-groove 2. The fibres can then be inserted with a lower insertion force which is likely to cause less damage to the lips. The final step is the removal of the chromium layer using a mild etchant. Once the pre-stress in the lips 3A, 3B has been removed the lips spring back to clamp the or each fibre firmly in the v-groove.

By modifying the process just described it is possible to produce a micro-miniature sensor. Thus the chromium layer can be replaced by a layer of another material the stresses in which affects the pressure with which overlayer 3 clamps the mounted optical fibre. This other material is chosen so that the pre-stressing varies in the presence of a measurand. As is well known, variations in pressure on an optical fibre cause variations in phase in light transmitted by the fibre so that the mounted fibre can be used as a sensor for the presence of the measurand. It would, of course, be necessary to provide a reference against which readings could be taken.

It will be appreciated that in all of the embodiments described with reference to FIGS. 1 to 9 that it is possible to vary the detailed configuration of the final microminiature mounting device. For example, in FIGS. 1 and 5 the overlayer 3 has a slit 4 providing a pair of lips which overhang the groove in the silicon substrate, whilst in the embodiments of FIGS. 4, 6 and 7 the overlayer 3 is continuous. However, these embodiments may also be provided with a slit producing a pair of overhanging lips. Naturally any of the embodiments described may be manufactured with a partial slit so that initially the or each enlarged opening portion and/or part of the subsequent v-groove is associated with a slit whilst the remainder of the v-groove is covered by a continuous overlayer. Additionally, any of the embodiments involving overhanging lips can be of the kind in which the lips, or individual beams as in FIG. 5, are pre-stressed in accordance with the embodiment of FIG. 9 and only clamp an inserted fibre once this pre-stressing has been released.

It will be particularly appreciated from the foregoing description that the entire processes of providing the various embodiments of microminiature clamp devices is one which involves a single micromachining step on a monolithic substrate. A single mask is required in the photolithographic step so that the entire procedure is relatively cheap, highly reproducible and very accurate.

Figure 11:
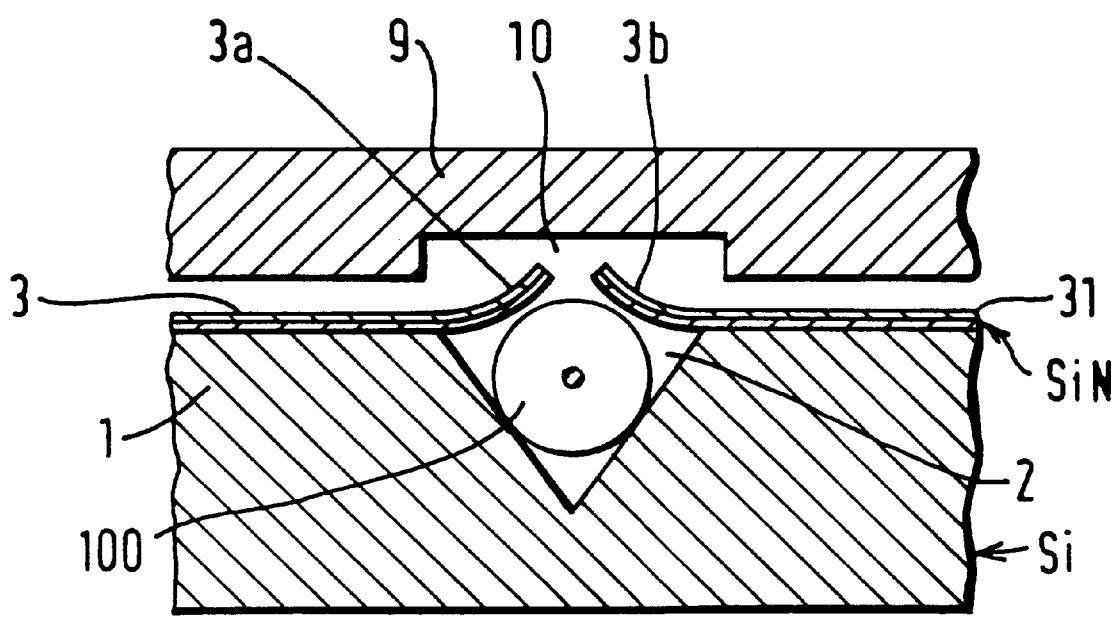
FIG. 11 shows a still further embodiment.
Figure 10A:
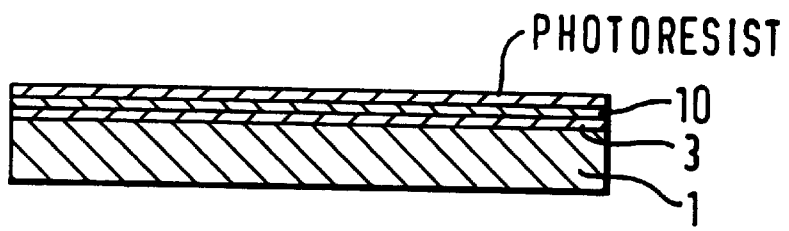
FIG. 10A to 10E show steps in the manufacture of the embodiment of FIG. 9.
Figure 10B:
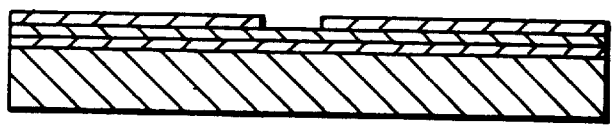
Figure 10C:
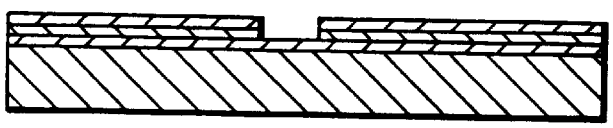
Figure 10D:
Figure 10E:
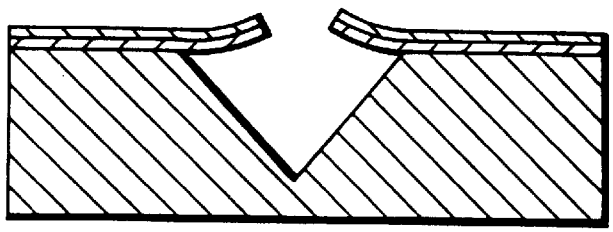

A still further embodiment is shown in FIG. 11 of the drawings. In this embodiment the overlayer 3 is coated with an electrical conducting layer 30. There are a number of suitable materials and these include Au/Cv, In SnO and doped diamond-like carbon. A second substrate 9 is provided spaced from the mounting device which has a recess 10 formed with a pattern of metal electrodes. The procedure of mounting the fibre 100 within groove 2 has the following steps.

Firstly, substrate 9 is brought into contact with substrate 1. The recess 10 is dimensioned such that the electrodes do not contact the layer 31. Substrate 1 is kept at ground potential and selected electrodes of substrate 9 have a voltage applied to them. If the overhanging lips 3a, 3b are of the same basic shape as those of the embodiment of FIG. 5 the various beams can be selectively raised to allow the fibre, or another element, to be inserted in the groove 2. Once the insertion has been completed the voltage applied to the electrodes of substrate 9 is removed allowing the overhanging beams or lips to claim the inserted fibre or element. If necessary substrate 1' can then be removed.

In all the previous embodiments the overlayer used to clamp the or each optical fibre has been deposited on the etched crystalline substrate prior to insertion of the fibre.

Figure 12:
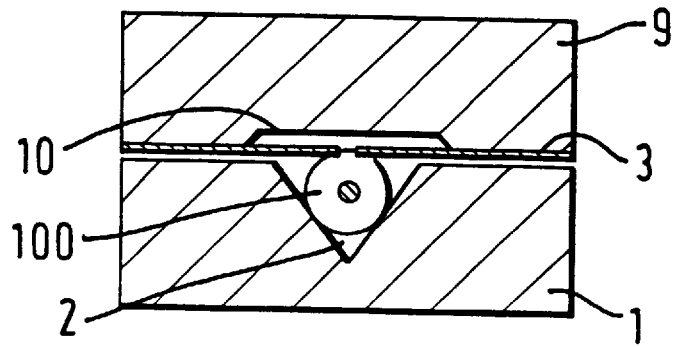
FIGS. 12, 13A to 13C, 14A, 14B and 15A to 15C show yet further embodiments.

As an alternative to this it is possible to provide the v-groove on substrate 1 and the resilient overlayer 3 used in the final clamping of the fibre on substrate 9 with the two substrates subsequently being bonded together. Using this approach it is possible, as in the embodiment of FIG. 11, to use electrostatic forces to deflect the lips at the time of fibre insertion, the lips being released after insertion to clamp the inserted fibre or fibres. This procedure is illustrated in FIG. 12.

Figure 13A:
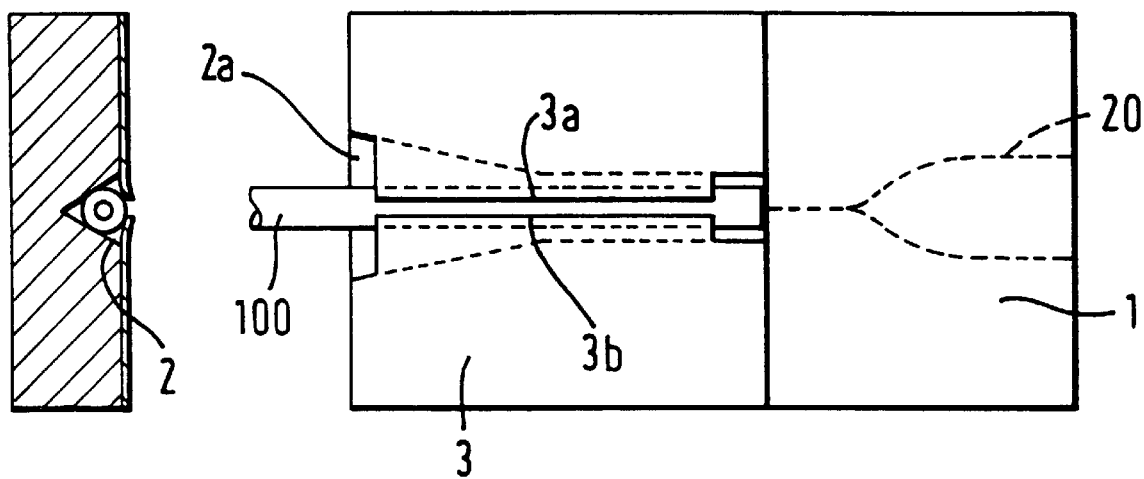
Figure 13B:
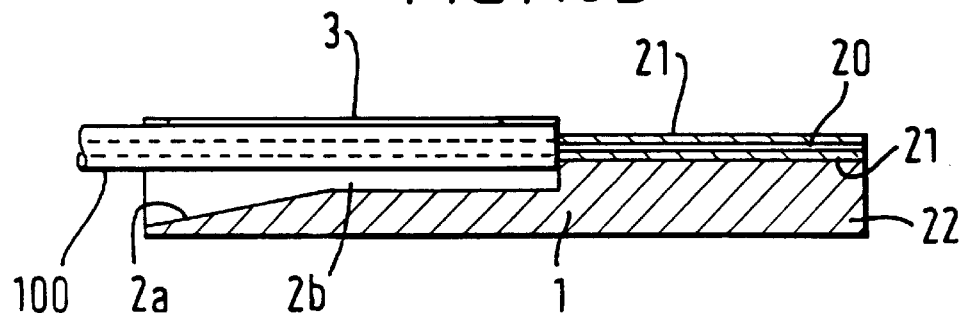
Figure 13C:
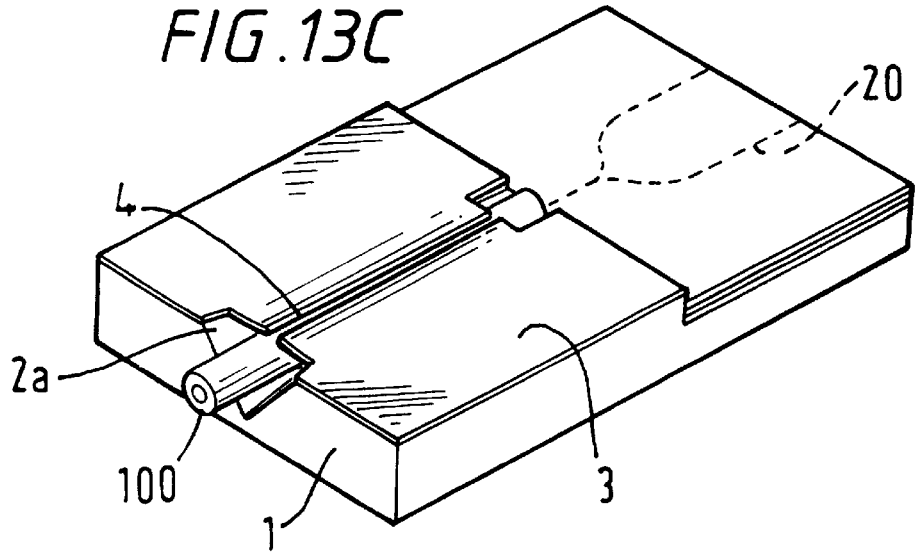

Some other specific applications of the miniature mounting device will now be described with reference to the remaining figures of the accompanying drawings. Thus FIGS. 13A, 13B and 13C of the accompanying drawings show an optical fibre 100 coupled to passive optical component in the form of a waveguide 20. As in the previous embodiments the substrate 1 is crystalline silicon. The mounting of the optical fibre is exactly the same as that described with reference to FIG. 6 of the accompanying drawings, save that in the present embodiment the silicon nitride overlayer is formed with a slit 4 so as to provide a pair of lips 3A, 3B. As can be seen from these FIGS. 13, the lips 3A, 3B are formed so that they end a short distance from the final location of the end face of fibre 100 when it has been mounted. The waveguide 20 is also mounted on the substrate 1 with waveguiding buffer layers 21, 22 located on either side thereof.

Figure 14A:
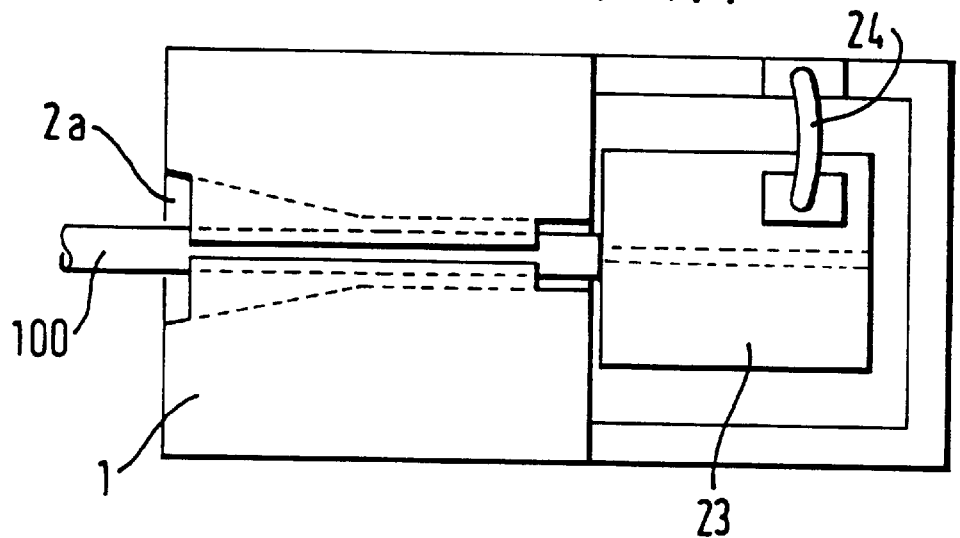
Figure 14B:
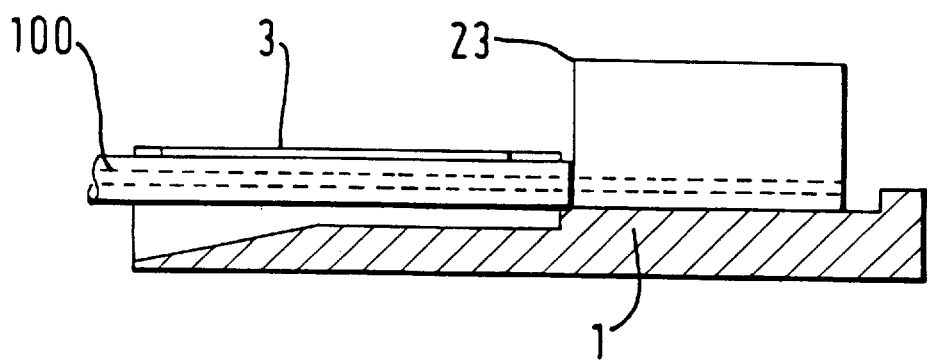

FIGS. 14A and 14B of the accompanying drawings show an optical fibre coupled 100 to a laser diode 23 which is wire bonded at 24 to the silicon substrate 1.

Figure 15A:
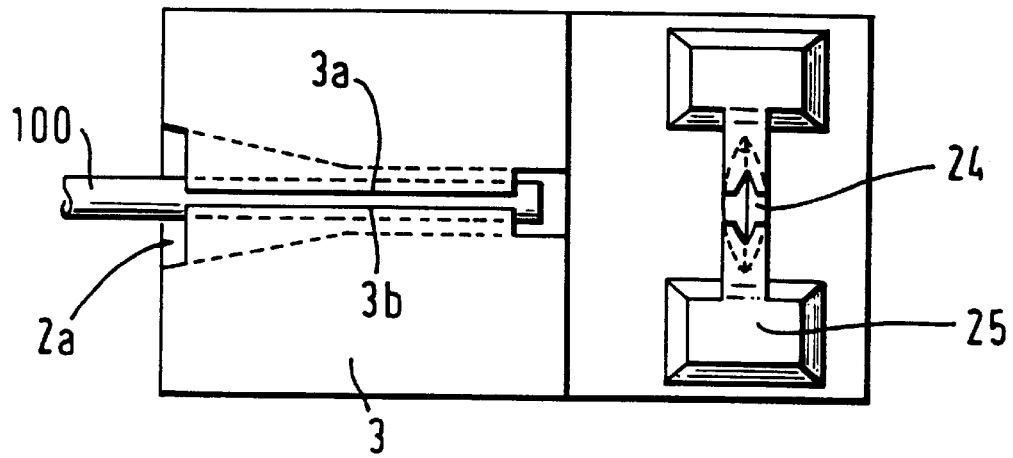
Figure 15B:
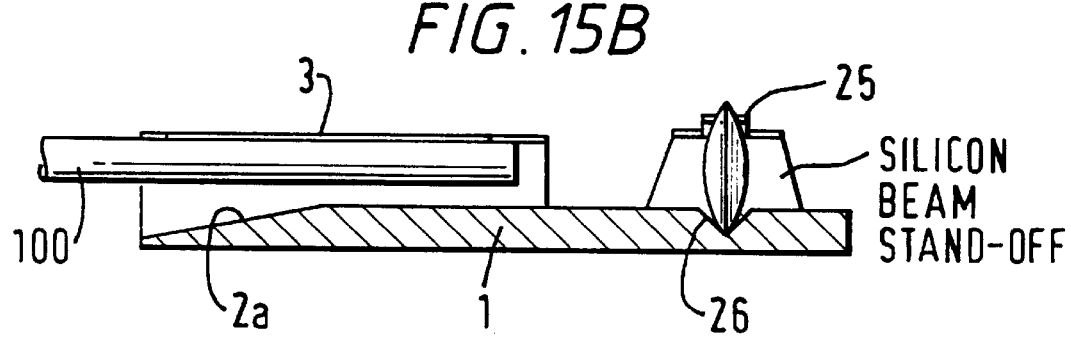
Figure 15C:
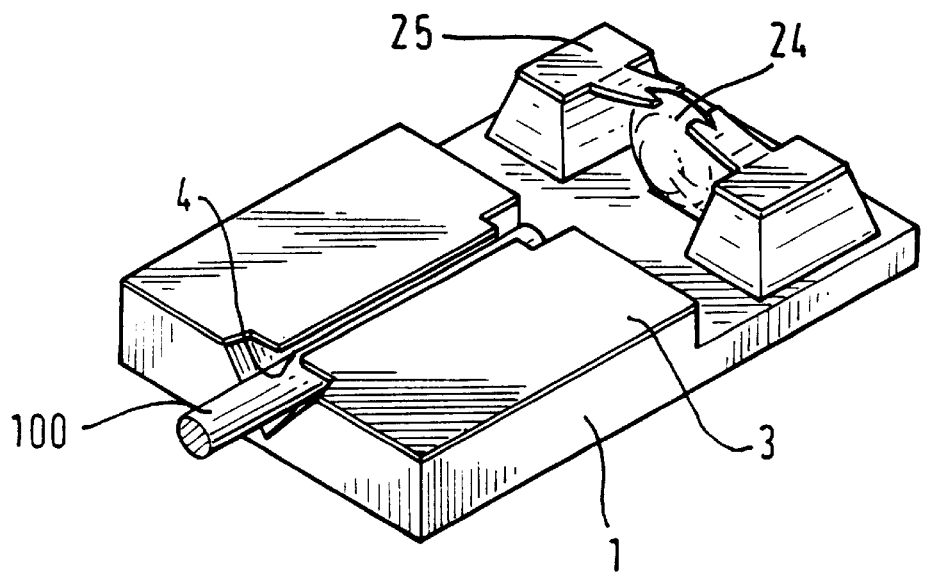

Finally, FIGS. 15A, 15B and 15C of the accompanying drawings show another interfacing application of the present invention in which an optical fibre 100 is coupled to a microminiature lens 24. The fibre is clamped in exactly the same manner as in the two previous embodiments. The microlens 24 is initially held by clamping beams 25 above a v-locating slot 26 etched in the silicon substrate 1. These beams are pre-stressed utilising a deposited chromium layer in a manner similar to that described with respect to the embodiments of FIG. 9 so as to hold the lens above slot 26. After removal of the chromium layer by etching the release of the stress allows the lens to be accurately located in the slot 26.

In the preceding description the material for the substrate 1 has been crystalline silicon and that of the overlayer silicon nitride. The latter material is particularly suited to use in the photolithographic etching process as it is easily plasma etched. Other possible materials for the overlayer include silicon oxide, silicon oxynitride, borophosphate, B.P.S.G., Teflon (RTM) or an amorphous metal. An alternative material for the substrate is quartz.

All the preceding description has been concerned with a single groove in a substrate. Obviously a single substrate could be provided with a plurality of grooves each adapted to receive one or more fibres or other elements. The substrate also can be adapted to carry or actually carry one or more components for cooperation with the plurality of elements mounted in the grooves therein.

We claim:

1. A miniature device for mounting one or more elongate elements and comprising a crystalline substrate having a groove formed therein along one surface thereof, the groove having at least one enlarged opening portion leading into the groove for coarse positioning of an element when it is initially inserted into the groove, and an overlayer extending at least partially over said groove and adapted to clamp said element when said element has been inserted into the groove, and wherein a pattern of openings is defined in said overlayer; and wherein a profile of the groove in a plane of said one surface is defined by said pattern, said groove having been anisotropically etched through the openings of said pattern with the anisotropic etch having self terminated at the limits of said pattern.

2. A device according to claim 1 wherein the cross-section of the enlarged portion reduces substantially steadily as it approaches the groove.

3. A component comprising a miniature device for mounting one or more elements and comprising a crystalline substrate having a groove formed therein, the groove having at least one enlarged opening portion leading into the groove for coarse positioning of an element when said element is initially inserted into the groove, and an overlayer extending at least partially over said groove and adapted to clamp said element when said element has been inserted into the groove, and wherein the overlayer is provided with a slit extending above said groove so as to define resilient lips which overhang the groove, and wherein the element mounted in the groove is an optical fibre and the portions of the overlayer which clamp the fibre are manufactured so that the stress on the fibre exerted thereby varies in the presence of a measurand so that the component can be used as a sensor for the measurand.

4. A device according to claim 1, wherein the non-enlarged section of the groove is v-shaped.

5. A device according to claim 4, wherein the substrate is silicon.

6. A device according to claim 5, wherein the overlayer is silicon nitride.

7. A device in accordance with claim 1, wherein said pattern in the overlayer defines a slit extending above said groove so as to define resilient lips which overhang the groove.

8. A miniature device for mounting one or more elements and comprising a crystalline substrate having a groove formed therein, the groove having at least one enlarged opening portion leading into the groove for coarse positioning of an element when it is initially inserted into the groove, and an overlayer extending at least partially over said groove and adapted to clamp said element when said element has been inserted into the groove, and wherein the overlayer is provided with a slit extending above said groove so as to define resilient lips which overhang the groove, and wherein said lips are pre-stressed so as to extend above the plane of the overlayer, so that on release of the pre-stressing they return to clamp an element within the groove therebelow.

9. A device according to claim 7 wherein each lip is provided by an array of beam-like elements extending cantilever fashion over the groove.

10. A device according to claim 1, wherein the groove leads to an aperture in the substrate in which a second element for cooperation with the element inserted into the groove can be located.

11. A miniature component comprising a device according to claim 1 in combination with an element mounted in the groove and held by said overlayer.

12. A component according to claim 11, wherein the mounting of the element in the groove includes an adhesive.

13. A component according to claim 11, wherein the element mounted in the groove is an optical fibre.

14. A component according to claim 13, wherein the component holds the ends of two optical fibres with the end faces of the fibres butting so that the fibres are coupled.

15. A component according to claim 11, wherein the optical fibre is coupled to a second component also mounted in the substrate.

16. A miniature mounting device for mounting an optical fibre, the device comprising:
    a) a crystalline substrate;
    b) an overlayer provided on one surface of said substrate;
    c) a pattern of openings defined in said substrate, said pattern comprising a widened portion at one end thereof progressively narrowing to a central slit; and
    d) a groove located in the substrate beneath the pattern, a profile of the groove on a plane of said surface conforming to the profile of said pattern, said groove having been anisotropically etched through the openings of said pattern with the anisotropic etch having self terminated at the limits of said pattern.

17. A device according to claim 16, wherein the openings in said pattern define a plurality of parallel ribs in said overlayer which extend resiliently over said groove.

18. A method of manufacturing a miniature mounting device for an elongate element, the device comprising a crystalline substrate having a groove formed therein, the groove having at least one enlarged opening portion leading into the groove for coarse positioning an element when it is initially inserted into the groove, and an overlayer extending at least partially over said groove and adapted to clamp said element when said element has been inserted into the groove, the method comprising the steps of:

providing the substrate with an overlayer material extending over a region to be occupied by the groove and its opening portion or portions;

forming a photoresist layer over said overlayer material;

forming a photolithographic pattern in the photoresist layer defining the extent of the groove and of the enlarged opening;

anisotropically etching the substrate through the pattern of the photoresist layer and overlayer material so as to generate said groove and opening portion with the anisotropic etch being self-terminating at the limits of the pattern; and removing the photoresist layer so that the remaining overlayer material extends over said groove and said at least one enlarged opening to provide means for clamping an element when said element is inserted into the groove via the enlarged opening.

19. A method according to claim 18, wherein the photolithographic pattern is such that a slit is provided in the overlayer material above the groove so as to form lips which overhang the groove.

20. A method of manufacturing a miniature mounting device comprising:

providing an overlayer on a crystalline substrate;

applying a layer of photoresist to the overlayer;

forming a photolithographic pattern on the photo resist layer;

anisotropically etching the substrate through the pattern to generate a groove having an enlarged opening at at least one end of the groove, and wherein the pattern is such that a slit is provided in the overlayer above the groove so as to form lips which overhang the groove and wherein the lips are pre-stressed so as after manufacture of the device to extend above the plane of the overlayer.

21. A method according to claim 18, wherein the substrate is crystalline silicon.

22. A method according to claim 18, wherein the overlayer is silicon nitride.

23. A method according to claim 20, wherein a stressed metal layer is deposited over said overlayer, the layer of photoresist is applied to the metal layer and the final device is manufactured by the post-lithographic steps of etching the metal layer, etching the overlayer and etching the substrate so as to generate the pre-stressed lips.

24. A method according to claim 23, wherein the pre-stressed layer is chromium.

25. A method according to claim 18 and including the step of inserting at least one element into the groove so that the element is mounted by the device.

26. A method according to claim 25, wherein the element is an optical fibre.

27. A method according to claim 26, wherein two optical fibres are inserted into opposite ends of the groove so as to couple the fibres.

28. A method according to claim 26, wherein a further element is mounted in the substrate and the optical fibre is coupled to this further element.

29. A method of manufacturing a miniature mounting device comprising:

providing an overlayer on a crystalline substrate;

forming a photolithographic pattern on the photo resist layer; anisotropically etching the substrate through the pattern to generate a groove having an enlarged opening at at least one end of the groove, wherein the pattern is such that a slit is provided in the overlayer above the groove so as to form lips which overhand the groove;

and including the step of inserting an optical plane into the groove so that the optical fibre is mounted within the device, and wherein the substrate is formed with a mirror surface which cooperates with the optical fibre inserted into the groove.

* * * * *